April 25, 1933.     W. L. EVANS     1,906,144
ELECTRIC FLUID HEATER
Filed Aug. 9, 1930
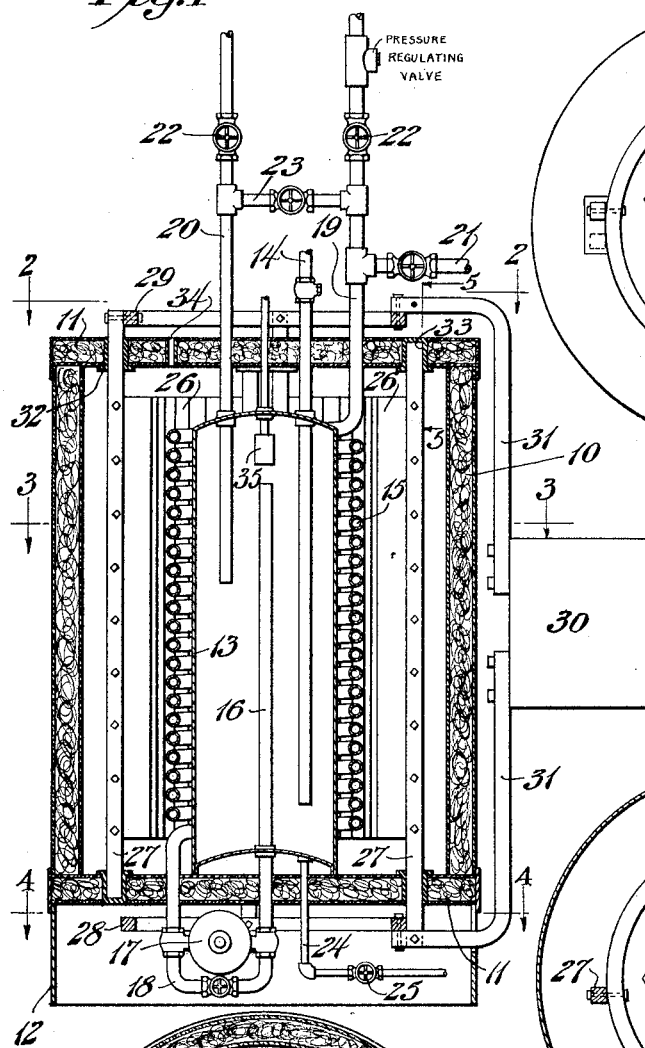
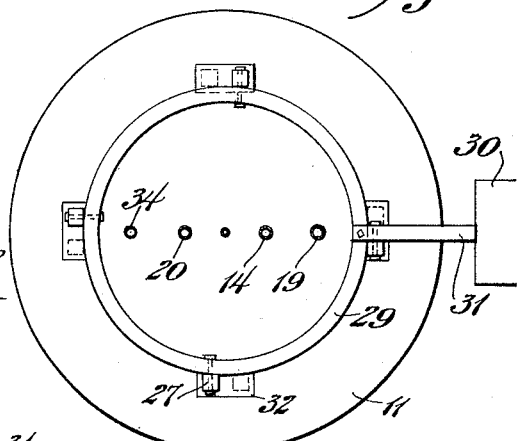
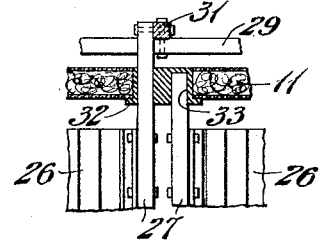
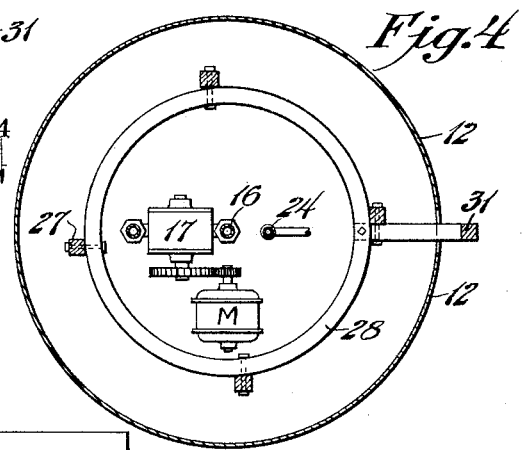
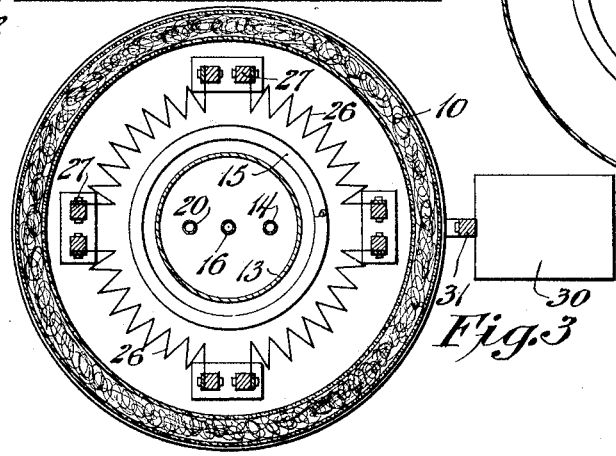
INVENTOR
W. L. Evans
BY Siggers + Adams
ATTORNEYS Patented Apr. 25, 1933

1,906,144

UNITED STATES PATENT OFFICE

WILLIAM L. EVANS, OF WASHINGTON, INDIANA

ELECTRIC FLUID HEATER

Application filed August 9, 1930. Serial No. 474,175.

This invention relates to electric fluid heaters and, among other objects, aims to provide a highly efficient heater installation having improved electric heater elements and a combined tank and coil heater or boiler so constructed and arranged as to raise the temperature of the water very rapidly and to make the system very economical for household heating as well as to produce hot water for domestic consumption.

This application involves important improvements on the system shown in my copending application, Ser. No. 413,692, filed December 13, 1929.

Other aims and advantages of the invention will appear in the specification, when considered in connection with the accompanying drawing, wherein:

Fig. 1 is a vertical sectional view of a heater embodying the invention; and

Figs. 2 to 5 inclusive are sectional views taken on the lines 2—2, 3—3, 4—4 and 5—5 respectively of Fig. 1.

Heretofore, many attempts have been made to produce electric water heaters which heat water as quickly, efficiently and economically as fluid or solid fuels. Several factors have militated against the success of such apparatus. For example, the proposed heater elements have not been highly efficient and have consumed too much current to make them economical. Further, the transmission of heat to the water has been too slow to make such heaters practicable. This invention, therefore, aims to overcome the foregoing difficulties by providing improved, highly efficient apparatus which is capable of producing and transmitting heat very rapidly and at a very low cost. The main idea is to provide an electric heating system which can compete with the combustible fuel systems now in common use, provided electricity is available at the low rates prevalent in some American cities.

Referring particularly to the drawing, the illustrated heater is there shown as being mounted in an insulated casing composed of a cylindrical wall 10 and removable end walls 11, all preferably made of non-conducting materials whereby to prevent waste of current by induction. This casing is conveniently made of insulating material such as mineral wool covered by inside and outside sheets of non-conducting material. If desired, it may be mounted on legs or a metal base 12 having openings to admit water pipes.

Within the casing and supported on the lower end wall 11, there is shown a metal tank or boiler 13 which is conveniently made of copper or sheet metal having a relatively high coefficient of heat transmission. The upper end of the tank preferably terminates short of the upper end wall of the casing to permit heated air to come in contact with its outer wall. Cold water is adapted to be supplied to the tank through a valved conduit or inlet pipe 14 in the same manner as water is supplied to an ordinary hot water tank.

Surrounding the tank and spaced from its outer wall, there is shown a tubular heating coil 15 which is preferably made of copper tubing of very small thickness, preferably about $\frac{1}{32}$ of an inch thick, so that the coefficient of heat transmission is increased to a maximum consistent with safety. It has been found that a copper tube of this thickness will transmit about 13/100 British thermal units per second per square inch for each degree difference in temperature between the interior and exterior of the tube.

The coil 15 is shown as being connected in series with the tank by means of a pipe 16 extending upwardly through the bottom nearly to the top of the tank and a pump 17 of any suitable type is arranged in the base and connected to pump the water from the top of the tank through the coil 15 to be distributed after it has absorbed an additional increment of heat. The pump is shown in Fig. 4 as being driven by a motor M. The idea of taking the water from near the top of the tank is to insure that the hottest water in the tank will be circulated through the coil. A valved bypass conduit 18 is connected to the tank outlet and to the inlet end of the coil so that the water can circulate freely through the coil without employing the pump.

In this instance, heated water is delivered to a main or hot water distributing pipe 19 connected to a riser (not shown) leading to a series of radiators or the like constituting a house or other heating system and the cooled water is returned to the tank by means of a return pipe 20. Furthermore, a service pipe 21 to deliver hot water for domestic or commercial use is connected to the delivery pipe 19. Both the delivery line and the return line are provided with valves 22 and a valved by-pass pipe 23 is connected to them below the valves so that the house heating system may be cut off and the circulation confined to the coil and the tank connected through the by-pass 23 and return pipe 20, whereby to store a supply of hot water in the tank and coil.

The usual drain pipe 24 is shown as being connected to the bottom of the tank and extends downwardly through the lower end wall. This pipe has an ordinary valve 25 to permit the tank to be drained or cleaned out when sediment accumulates in the bottom.

Between the inside wall of the cylindrical casing and the coil 15 there is shown a series of corrugated resistance plates or elements 26 each having V-shaped corrugations. These plates are preferably rectangular and are bent so that they are substantially coaxial with the casing wall and extend from near the lower end of the casing to the air space above the top of the tank. In this instance, there are four such corrugated plates or resistance elements connected at their opposite side edges to vertical bus-bars or conductors 27 to which the current at low voltage is supplied. As will be noted in Figs. 1, 2 and 5, the bus-bars for the respective plates or elements are arranged in pairs. One bus-bar of each pair extends through one end wall of the casing 10 and the projecting ends of the respective bars are connected to annular conductors or bars 28 and 29 at the bottom and top of the casing on the outside. A bus-bar at one side of a resistance element is connected to the annular conductor or bar at one end of the casing and the bus-bar at the other side of the resistance element is connected to the annular conductor or bar at the other end of the casing, the idea being to reduce losses by inductance and reactance. It has been found that if the current flows in the same direction through the bus-bars, the losses are greater than they are using the present arrangement.

The annular conductors or bars 28 and 29 are here shown as being connected to the opposite sides or terminals of a low voltage transformer 30 by means of conductor bars 31. The transformer is preferably arranged at one side of the heater casing so that it is easily accessible and does not take up any space below the casing. It will, of course, be understood, that the bus-bars 27 are suitably insulated from the casing. In this example, suitable insulating and supporting members 32 for adjacent bus-bars are shown as extending through the end walls, one end of each bus-bar extending therethrough, while the end of the adjacent bus-bar is supported in a socket 33 in the member 32. The supporting members also serve to prevent noisy vibration of the bus-bars. Current is supplied from the transformer at voltages ranging from about 1 to 10 volts. It has been found that low voltages produce far better results than high voltages. The construction is such that the transformer may be connected to an ordinary household circuit of 110 to 220 volts, alternating current. Excellent results have also been obtained with an ordinary direct current plating generator.

Referring to Fig. 3, the end wall 11 of the casing is shown as having a small vent opening 34 to permit expansion and contraction of the air in the casing due to changes in temperature. However, heated air is confined within the casing so that it has to transmit its heat to the water. It will be understood that the current may be controlled automatically in response to temperature conditions within the tank by means of an ordinary thermostat 35 operatively connected to an electric switch (not shown).

From the foregoing description of the illustrative installation, it is believed that the operation will be clearly understood. Calculators indicate that an installation of this type having a copper heating coil of 3000 sq. in. heating surface will heat 20 lbs. of water 100° per minute when the temperature difference between the coil and heater elements is maintained at 200° F. Using current at one-half cent per kilowatt, the cost of heating water would be ⅛ of a cent per gallon, raising the temperature from 62° to 162°. This low cost of heating makes a system of the type shown exceedingly economical for heating homes, factories and other buildings, as well as for supplying hot water for domestic and commercial consumption. The significance of this can be appreciated when it is understood that large electrical companies have heretofore been unsuccessful in introducing electric water heaters for domestic use because of their low efficiency, the excessive time required for raising the temperature of the water and the cost of current. Insofar as I am aware, no electric heater capable of raising the temperature of 18 gallons of water 100° in less than 60 minutes for domestic use has yet been devised. With the illustrative heater, this result can be accomplished in 9 minutes. By utilizing a pump of greater capacity, the time required for heating may be somewhat reduced. Thus, the invention has overcome the most serious drawbacks to the use of electrical water heating equipment so that hot water and steam heating systems may be heated electrically very economically. Further, the initial cost of an installation is very reasonable and the expense of upkeep practically negligible. Moreover, the water heater may be very easily converted into a steam generator so that it may be used in steam heating systems. The term "water heater" in the claims is used to apply to either system.

Obviously, the present invention is not restricted to the particular embodiment thereof herein shown and described. Moreover, it is not indispensable that all the features of the invention be used conjointly, since they may be employed advantageously in various combinations and sub-combinations.

What I claim is:—

1. A water heater comprising, in combination, a substantially cylindrical casing; a tank within the casing; a tubular coil around the tank; having an inlet pipe extending through the upper end of the tank; a water circulating pump connected to pump water through the coil; a valved by-pass pipe around the pump; a main delivery pipe connected to the coil constituting a trunk line for a heating system; a return pipe for the system discharging into the tank; a valved by-pass connecting the delivery and return pipes; and valves in both of said pipes so arranged that the heating system may be cut off and the water circulated through the tank and the coil.

2. A water heater comprising, in combination, a heat-insulating casing which is completely closed; a water tank within the casing; a coil of very thin copper tubing surrounding the tank and spaced therefrom; a pipe leading from the interior of the tank to the bottom of the coil; another pipe connected to the top of the coil and leading outside the casing; bare sheet metal resistance members of very large surface area spaced from and surrounding the coil within the casing; and a source of low voltage electricity connected with said resistance member.

3. A fluid heater of the character described comprising a casing; a fluid container in the casing; a plurality of independent and bare, sheet metal resistance units surrounding the container; bus bars removably mounted on the casing and supporting said units; and means to supply low voltage current to the resistance elements.

4. A fluid heater of the character described comprising a casing; a fluid container in the casing; a plurality of independent, sheet metal resistance units surrounding the container; a step-down transformer at one side of the casing; annular conductors at the upper and lower ends of the casing; and pairs of bus-bars connecting the conductors to opposite sides of the resistance units and removably mounted in said casing.

5. A fluid heater of the character described comprising a casing; a fluid container in the casing; a plurality of independent, sheet metal resistance units surrounding the container; a step down transformer at one side of the casing; annular conductors at the upper and lower ends of the casing; bus-bars projecting from the upper conductor into the casing and connected to one side of the respective resistance units; and bus-bars projecting from the lower conductor and connected to the other side of the respective resistance units.

6. In a heater installation of the character described, a substantially cylindrical casing; a plurality of corrugated, sheet metal resistance elements within the casing; bus-bars projecting through both end walls of the casing and connected to the opposite sides of said resistance elements, the bus-bars for each element extending through opposite end walls and insulated therefrom; conductors connected to the outer ends of said bars; and a step down transformer connected to supply current at low voltage to said elements.

7. A heater comprising, in combination, a closed casing made of material which is substantially a non-conductor for both heat and electricity; a cylindrical water tank placed centrally within the casing, leaving a relatively wide annular space between; a tubular metallic coil connected with the interior of the tank near the top and completely surrounding the tank except at the ends and spaced from the exterior of said tank; a pipe connected to said coil for conducting away hot water or steam; a heating element comprising a sheet metal resistance which surrounds the coil but is spaced from both the coil and the inside walls of the casing; and a source of electricity connected to the heating element.

8. A heater comprising, in combination, a closed casing made of material which is substantially a non-conductor for both heat and electricity; a cylindrical water tank placed centrally within the casing, leaving a relatively wide annular space between; a tubular metallic coil connected with the interior of the tank near the top and completely surrounding the tank except at the ends and spaced from the exterior of said tank; a pipe connected to said coil for conducting away hot water or steam; a heating element comprising a sheet metal resistance which surrounds the coil but is spaced from both the coil and the inside walls of the casing; said sheet metal resistance being made up of a plurality of arcuate members each of which is bent into zig-zag form, said members being connected together along their vertical edges by bus bars to form an annular resistance element; and a source of electricity connected to the heating element.

9. A heater comprising, in combination, a closed casing made of material which is substantially a non-conductor for both heat and electricity; a cylindrical water tank placed centrally within the casing, leaving a relatively wide annular space between; a tubular metallic coil connected with the interior of the tank near the top and completely surrounding the tank except at the ends and spaced from the exterior of said tank; a pipe connected to said coil for conducting away hot water or steam; a heating element comprising a sheet metal resistance which surrounds the coil but is spaced from both the coil and the inside walls of the casing; said sheet metal resistance being made up of a plurality of arcuate members each of which is bent into zig-zag form, said members being connected together along their vertical edges by bus bars to form an annular resistance element; two of the bus bars on opposite sides having ends projecting through the top and bottom respectively of the casing and being connected to annular conductors or bus bars respectively at the top and bottom of the casing on the outside; and a source of electricity connected to the heating element.

In testimony that I claim the foregoing as my own, I have hereto affixed my signature.

W. L. EVANS.